(12) United States Patent
Masuda et al.

(10) Patent No.: US 6,248,143 B1
(45) Date of Patent: Jun. 19, 2001

(54) COMPOSITION FOR POLISHING GLASS AND POLISHING METHOD

(75) Inventors: Tomoyuki Masuda; Hiroshi Mizukami, both of Nagano; Nobuhiko Ohara; Yutaka Yamauchi, both of Chiba, all of (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/238,782

(22) Filed: Jan. 27, 1999

Related U.S. Application Data

(60) Provisional application No. 60/083,304, filed on Apr. 28, 1998.

(30) Foreign Application Priority Data

Jan. 27, 1998 (JP) .................................................. 10-014257

(51) Int. Cl.[7] .............................. C09K 3/14; C09G 1/02; B24B 37/00
(52) U.S. Cl. .................................. 51/307; 51/309; 106/3; 510/163; 510/180; 510/181; 510/397; 451/36; 451/41; 451/42
(58) Field of Search ........................... 51/307, 309, 293; 106/3; 510/180, 163, 181, 397; 451/36, 41, 42

(56) References Cited

U.S. PATENT DOCUMENTS

| | | | |
|---|---|---|---|
| 3,607,161 | * | 9/1971 | Monick .................................. 51/307 |
| 3,715,842 | * | 2/1973 | Tredinnick et al. .................... 51/307 |
| 3,971,169 | * | 7/1976 | Byrne ..................................... 51/307 |
| 4,046,524 | * | 9/1977 | Van Hesden ........................... 51/306 |
| 4,657,692 | * | 4/1987 | Choy et al. ........................... 510/369 |
| 4,959,113 | * | 9/1990 | Roberts ................................ 252/79.2 |
| 5,108,645 | * | 4/1992 | Obama et al. ............................ 134/7 |
| 5,114,438 | * | 5/1992 | Leatherman et al. .................. 51/308 |
| 5,190,594 | * | 3/1993 | Chou et al. ............................... 134/6 |
| 5,910,471 | * | 6/1999 | Christianson et al. ................. 51/307 |

OTHER PUBLICATIONS

Derwent Acc–No; 1992–157774 (abstract based on SU 1654320A), derwent week 199219, Feb. 1989.*

* cited by examiner

*Primary Examiner*—Michael Marcheschi
(74) *Attorney, Agent, or Firm*—Sughrue, Mion, Zinn, Macpeak & Seas, PLLC

(57) ABSTRACT

An abrasive composition for polishing glass, containing a basic salt of magnesium. Also disclosed is a method for polishing glass with the abrasive composition.

16 Claims, No Drawings

COMPOSITION FOR POLISHING GLASS AND POLISHING METHOD

CROSS REFERENCE TO RELATED APPLICATIONS

This application is an application filed under 35 U.S.C. §111(a) claiming benefit pursuant to 35 U.S.C. §119(e)(i) of the filing date of the Provisional Application No. 60/083,304 filed Apr. 28, 1998 pursuant to 35 U.S.C. §111(b).

FIELD OF THE INVENTION

The present invention relates to an abrasive composition for polishing glass. More specifically, the present invention relates to an abrasive composition for polishing glass, which can form an excellent polished surface free of flaws. More particularly, the present invention relates to an abrasive composition for polishing glass such as a substrate for magnetic disks, which can polish glass to a high precision mirror face suitable for flying a magnetic head at a low glide height, and also to a method for polishing glass with the abrasive composition.

BACKGROUND OF THE INVENTION

Glass is used as a substrate for magnetic disk storage media, which disks are installed in a drive device of personal computers and the like. This is because glass substrates are advantageous in that their impact strength is high and they have increased smoothness as compared with aluminum substrates. In recent years, to cope with demands for higher recording density, the distance between the magnetic head and the magnetic disk substrate has been progressively reduced. Accordingly, the glass substrate for magnetic disks necessarily has high precision flatness, a low surface roughness and is nearly free of flaws.

For polishing various glasses, materials such as cerium oxide, zirconium oxide, iron oxide and silicon dioxide have been conventionally used. At present, abrasive compositions mainly comprising cerium oxide (hereinafter referred to as "cerium oxide-type abrasive compositions") are predominantly used due to their high polishing efficiency.

With respect to the abrasive composition for polishing the glass substrate of a magnetic disk, the following techniques have been proposed in which additives are added to an abrasive mainly comprising cerium oxide, zirconium oxide or aluminum oxide to adjust the slurry properties and thereby improve the polishing efficiency and polishing precision.

(1) JP-A-3-146584 (the term "JP-A" as used herein means an "unexamined published Japanese patent application") entitled "Abrasive for Polishing Glass" proposes to incorporate calcium aluminate, magnesium sulfate or magnesium chloride into an abrasive mainly comprising zirconium oxide.

(2) JP-A-3-146585 entitled "Abrasive for Polishing Glass" proposes to incorporate magnesium chloride into an abrasive mainly comprising cerium oxide.

(3) JP-A-9-109020 entitled "Composition for Polishing Magnetic Disk and Polishing Solution Using the Same" proposes to incorporate gibbsite and a dispersant into an abrasive mainly comprising aluminum oxide.

There is a great demand for glass substrates for magnetic disks having further improved surface precision. For stably achieving a low glide height as a property required for the glass substrate of a magnetic disk, conventional abrasive compositions cannot ensure the requisite low surface roughness and a clean glass surface that is free from attachments.

As described in the foregoing, in order to achieve higher magnetic disk recording density, it is essential to reduce the glide height of the magnetic head. Therefore, irregularities in the magnetic disk profile must be removed with higher precision. When a crystallized glass or a tempered glass substrate used as the glass substrate of a magnetic disk is polished using a conventional cerium oxide-type abrasive composition, a problem arises in that a low surface roughness necessary for reducing the glide height of the magnetic head to the required level cannot be obtained. Furthermore, because the cerium oxide-type abrasive compositions have high chemical reactivity with glass, attachments remain on the surface of the glass substrate of the magnetic disk. The attachments are difficult to thoroughly remove even by applying thereto mechanical energy such as ultrasonic cleaning or scrub cleaning, and the magnetic head contacts the residual attachments. Thus, the magnetic disk surface substantially fails to obtain the high precision needed for reducing glide height.

SUMMARY OF THE INVENTION

As a result of extensive investigations for an abrasive most suited to achieve a high precision polished surface for the glass substrate of a magnetic disk, the present inventors have found that by using an abrasive composition for polishing glass, comprising a basic salt of magnesium, particularly at least one salt selected from magnesium hydroxide, magnesium carbonate, basic magnesium carbonate and magnesium phosphates, a high precision polished surface which conventional cerium oxide-type abrasive compositions cannot achieve is obtained. Furthermore, when a glass polished surface obtained by polishing glass with an abrasive mainly comprising at least one of cerium oxide, zirconium oxide, iron oxide and silicon dioxide is polished using an abrasive composition containing a basic salt of magnesium, particularly at least one salt selected from magnesium hydroxide, magnesium carbonate, basic magnesium carbonate and magnesium phosphates, residual attachments such as the cerium oxide-type abrasive can be removed and at the same time, a high precision glass polished surface can be obtained. As a result, further reduction in the glide height of a magnetic head, which is difficult to realize by conventional techniques, can be achieved.

DESCRIPTION OF THE PREFERRED EMBODIMENTS

Specific examples of the basic salt of magnesium for use in the present invention include magnesium hydroxide, magnesium carbonate, basic magnesium carbonate (e.g., $3MgCO_3 \cdot Mg(OH)_2$) and magnesium phosphates such as magnesium phosphate, magnesium hydrogenphosphate and magnesium pyrophosphate ($Mg_2P_2O_7$). However, the present invention is by no means limited thereto.

In the present invention, the purity of these compounds is not particularly limited.

The basic salt of magnesium for use in the present invention contributes in the powder state itself to the polishing and accordingly, the grain size thereof is, in terms of an average grain size, preferably from 0.1 to 10 µm. If the average grain size exceeds 10 µm, considerable sedimentation takes place in a slurry to cause problems in working the glass substrate. Also, depending on the case, the polished surface cannot achieve the required low roughness. On the other hand, if the average grain size is less than 0.1 µm, the polishing efficiency is disadvantageously reduced.

The addition amount of the basic salt of magnesium for use in the present invention is, in terms of a solids concentration in a slurry (in the case of using two or more basic salts of magnesium, as a total amount thereof), preferably from 1 to 40 wt %, more preferably from 5 to 30 wt %. If the addition amount is less than 1 wt %, a high precision surface can hardly be obtained and surface flaws are readily apparent, whereas even if the addition amount exceeds 40 wt %, further improvement is not obtained.

In the case where one or more basic salts of magnesium are mixed, the mixing ratio thereof can be freely selected.

The basic salts of magnesium for use in the present invention may differ with respect to water of crystallization, crystal system, appearance shape or form even though they have the same chemical formula (excluding water of crystallization), and these salts are not particularly limited.

The solvent or dispersing medium for the abrasive composition of the present invention is not limited to water, however, a water system is preferred.

In order to further improve dispersibility, prevent sedimentation, improve stability or improve workability, the abrasive composition of the present invention may contain, if desired, a glycol such as ethylene glycol and polyethylene glycol, a phosphate such as tripolyphosphate and hexametaphosphate, a polymer dispersant such as polyacrylate, a cellulose such as methyl cellulose and carboxymethyl cellulose, or a water-soluble polymer such as polyvinyl alcohol. The addition amount of these additives is usually from 0.05 to 20 wt %, preferably from 0.1 to 15 wt %, more preferably from 0.1 to 10 wt %, based on the abrasive composition.

Furthermore, in order to improve the polishing efficiency, the abrasive composition of the present invention may contain a substance which accelerates the polishing of glass. Examples thereof include amino acid compounds such as arginine, amine compounds such as melamine and triethanolamine, fluoride rare earth compounds such as cerium fluoride, and organic acids such as citric acid, tartaric acid, malic acid and gluconic acid.

The abrasive composition of the present invention can be prepared by mixing various raw materials constituting the composition and the preparation method therefor is not particularly limited. The composition is preferably prepared by mechanically mixing the raw materials at the mixing ratio specified above using a ball mill or a high-speed mixer.

The abrasive composition of the present invention may be used in the same manner as normal abrasive compositions, however, the polishing is preferably performed such that the material to be polished is coarsely polished with an abrasive mainly comprising at least one of cerium oxide, zirconium oxide, iron oxide and silicon dioxide, and then polished using an abrasive composition containing a basic salt of magnesium, particularly at least one or more basic salts selected from magnesium hydroxide, magnesium carbonate, basic magnesium carbonate and magnesium phosphates such as magnesium phosphate, magnesium hydrogenphosphate and magnesium pyrophosphate. As a result, high precision polishing which cannot be achieved by conventional techniques can be efficiently attained.

After polishing, the polished material is usually subjected to ultrasonic cleaning in pure water which may contain a surface active agent as needed. To facilitate cleaning, the polished substrate is further preferably subjected to ultrasonic cleaning in a dilute aqueous solution of a strong acid such as hydrochloric acid, sulfuric acid or nitric acid, or in a slightly diluted aqueous solution in the case of a weak acid. Additionally, ultrasonic cleaning in an aqueous ammonium salt solution is preferred when the abrasive composition comprises magnesium hydroxide.

By polishing with the abrasive composition of the present invention, the glass surface after the above-described cleaning is substantially free of residual attachments as compared with conventional products, and the glide height of the magnetic head can be reduced to about 0.25 µinch. Hence, a pronounced effect in achieving higher densities is obtained by polishing the glass substrate of a magnetic disk with the abrasive composition of the present invention.

EXAMPLES

The present invention is described in greater detail below by reference to the following Examples and Comparative Examples. However, the present invention should not be construed as being limited thereto.

Magnesium hydroxide and magnesium carbonate were employed in the Examples as the basic salt of magnesium, however, the present invention is by no means limited thereto.

Examples 1 to 14

Magnesium hydroxide (KYOWASUIMAG F, produced by Kyowa Kagaku Kogyo KK, average grain size: $d_{50}$=4 µm) as a raw material was classified, and coarse grains were removed therefrom to obtain grains having an average grain size $d_{50}$=3.5 µm (hereinafter referred to as "Magnesium Hydroxide A"). Separately, the magnesium hydroxide as a raw material was pulverized and then classified to obtain fine grains (average grain size $d_{50}$=0.5 µm) (hereinafter referred to as "Magnesium Hydroxide B").

Furthermore, magnesium carbonate produced by Kyowa Kagaku Kogyo KK (average grain size $d_{50}$=1.0 µm, for use as a filler) was pulverized and then classified to obtain fine grains having an average grain size $d_{50}$=0.5 µm.

A high-speed mixer was used under the conditions shown in Table 1 to prepare the abrasive compositions of Examples 1 to 14 in a pure water dispersion system. At this time, a polyacrylic acid-type dispersant (produced by Kao Corporation, Poizu 530) was added to each composition in an amount of 1 wt % based on the powder.

A 2.5-inch crystallized glass substrate (containing a crystal phase of lithium silicate and cristobalite and an amorphous phase, $R_a$=10 Å, $R_{max}$=250 Å, shown as "Work I" in Table 1) mainly comprising lithium silicate or a 2.5-inch tempered glass substrate ($R_a$=9 Å, $R_{max}$=180 Å, shown as "Work II" in Table 1) mainly comprising aluminosilicate was first polished with a cerium oxide-type abrasive (ROX H-1, produced by Touhoku Kinzoku Kagaku KK). The two prepared substrates were subsequently polished under the following conditions.

Polishing Machine

Four way type double polishing machine (Model 5B, manufactured by Fujikoshi Kikai Kogyo KK)

Polishing Pad

Suede type (CIEGAL 1900W, manufactured by Chiyoda KK)

Slurry feeding rate: 60 ml/min

Lower table speed: 45 rpm

Work pressure: 75 g/cm$^2$

Polishing time: 7 min

After polishing, the glass disks were removed from the polishing machine, subjected to ultrasonic cleaning in pure water and then to ultrasonic cleaning in a dilute aqueous nitric acid bath (concentration: 1 wt %), washed with pure water, dried and evaluated as follows.

(i) Disk Surface Roughness: $R_a$, $R_{max}$

Surface roughnesses $R_a$ and $R_{max}$ were determined using an atomic force microscope (AFM).

(ii) Disk Surface Flaws

Attachments, pits and scratches were observed using a differential interference microscope, and the surface flaws were evaluated according to the following criteria of ○: good, Δ: normal and ×: bad.

(iii) Head Glide Height: GA (Glide Avalanche)

A magnetic film was coated on the polished disk and the head glide avalanche (GA) was measured. More specifically, a 60 nm-thick Cr film as an undercoat layer, a 20 nm-thick $Co_{13}Cr_6Pt_3Ta$ alloy film as a magnetic layer and a 10 nm-thick carbon film as a protective layer were formed one at a time at a substrate temperature of 200° C. by sputtering. Furthermore, a PFPE-type (perfluoropolyether-type) lubricant was coated thereon, and the magnetic recording medium thus obtained was measured with respect to GA using a glide height tester (manufactured by Sony Tektronix Corp.).

The results obtained are shown in Table 1.

The average grain size of the abrasives was determined by a Granulometer HR850 manufactured by CILAS Corp.

Comparative Examples 1 and 2

For the purpose of comparison, a previously polished glass substrate was polished using a 10 wt % water dispersion slurry of a cerium oxide abrasive for final polishing (ROX F620, produced by Touhoku Kinzoku Kagaku KK) in place of the basic salt of magnesium for use in the present invention, and then evaluated. The sample preparation conditions and evaluation were the same as those used in the Examples of the invention.

As seen by comparing the results for the Examples of the invention with the Comparative Examples, the present invention provided reduced surface roughness, a low incidence of surface flaws and improved glide avalanche. The glide avalanche achieved by the Examples of the invention was a low numerical value which conventional abrasives cannot attain.

In accordance with the present invention, a surface profile having few irregularities which cannot be attained by conventional abrasive compositions is achieved by polishing with the abrasive composition of the invention. Also, in the case of a glass substrate for magnetic disks, the glide height of the magnetic head can be further reduced, thereby realizing a higher density hard disk. Thus, the present invention provides a very industrially useful abrasive composition.

While the invention has been described in detail and with reference to specific embodiments thereof, it will be apparent to one skilled in the art that various changes and modifications can be made therein without departing from the spirit and scope thereof.

What is claimed is:

1. A glass polishing composition comprising a slurry containing a basic salt of magnesium, wherein said basic salt of magnesium has an average grain size of from 0.1 to 10 μm.

2. The glass polishing composition as claimed in claim 1, wherein the basic salt of magnesium is at least one selected from the group consisting of magnesium hydroxide, magnesium carbonate, basic magnesium carbonate and magnesium phosphates.

3. A method for polishing glass, which comprises (i) polishing said glass with an abrasive comprising at least one of cerium oxide, zirconium oxide, iron oxide or silicon dioxide, and (ii) further polishing said glass with an abrasive composition containing a basic salt of magnesium.

4. A method for polishing glass, which comprises (i) polishing said glass with an abrasive comprising at least one of cerium oxide, zirconium oxide, iron oxide or silicon dioxide, and (ii) further polishing said glass with an abrasive composition containing a basic salt of magnesium selected from the group consisting of magnesium hydroxide, magnesium carbonate, basic magnesium carbonate and magnesium phosphates.

5. The glass polishing composition as claimed in claim 1, wherein the slurry contains said basic salt of magnesium in an amount of from 1 to 40 wt % in terms of a solids concentration of the slurry.

TABLE 1

| | Basic salt of Magnesium | | | | | Evaluation of | | | |
| --- | --- | --- | --- | --- | --- | --- | --- | --- | --- |
| | | Average Grain | Concentration | Compounded Ratio | Kind of | Disk Surface Roughness | | Evaluation of Surface | GA |
| | Name | Size (μm) | (wt %) | (wt % ratio) | Work | $R_a$ (Å) | $R_{max}$ (Å) | Flaws | (μ inch) |
| Example 1 | $Mg(OH)_2$ | 3.5 | 20 | 100 | I | 4 | 70 | ○ | 0.27 |
| Example 2 | $Mg(OH)_2$ | 0.5 | 20 | 100 | I | 4 | 64 | ○ | 0.25 |
| Example 3 | $Mg(OH)_2$ | 3.5 | 10 | 100 | I | 4 | 65 | ○ | 0.25 |
| Example 4 | $Mg(OH)_2$ | 0.5 | 10 | 100 | I | 4 | 62 | ○ | 0.25 |
| Example 5 | $Mg(OH)_2$ | 0.5 | 3 | 100 | I | 7 | 101 | Δ | 0.32 |
| Example 6 | $MgCO_3$ | 0.5 | 20 | 100 | I | 5 | 74 | ○ | 0.27 |
| Example 7 | $MgCO_3$ | 0.5 | 10 | 100 | I | 4 | 71 | ○ | 0.25 |
| Example 8 | $MgCO_3$ | 0.5 | 3 | 100 | I | 8 | 112 | Δ | 0.33 |
| Example 9 | $Mg(OH)_2$—$MgCO_3$ | 0.5 | 10 | 50–50 | I | 5 | 69 | ○ | 0.26 |
| Example 10 | $Mg(OH)_2$ | 3.5 | 10 | 100 | II | 4 | 54 | ○ | 0.26 |
| Example 11 | $Mg(OH)_2$ | 0.5 | 10 | 100 | II | 3 | 58 | ○ | 0.26 |
| Example 12 | $Mg(OH)_2$ | 0.5 | 3 | 100 | II | 6 | 97 | Δ | 0.34 |
| Example 13 | $MgCO_3$ | 0.5 | 10 | 100 | II | 4 | 59 | ○ | 0.25 |
| Example 14 | $Mg(OH)_2$—$MgCO_3$ | 0.5 | 10 | 50–50 | II | 4 | 60 | ○ | 0.27 |
| Comparative Example 1 | $CeO_2$ | 1 | 10 | 100 | I | 9 | 165 | Δ | 0.38 |
| Comparative Example 2 | $CeO_2$ | 1 | 10 | 100 | II | 7 | 133 | Δ | 0.37 |

6. The glass polishing composition as claimed in claim 1, wherein the slurry contains said basic salt of magnesium in an amount of from 5 to 30 wt % in terms of a solids concentration of the slurry.

7. The glass polishing composition as claimed in claim 2, wherein the slurry contains said basic salt of magnesium in an amount of from 1 to 40 wt % in terms of a solids concentration of the slurry.

8. The glass polishing composition as claimed in claim 2, wherein the slurry contains said basic salt of magnesium in an amount of from 5 to 30 wt % in terms of a solids concentration of the slurry.

9. The method as claimed in claim 3, wherein step (ii) comprises polishing said glass with an abrasive composition containing a basic salt of magnesium having an average grain size of from 0.1 to 10 μm.

10. The method as claimed in claim 3, wherein step (ii) comprises polishing said glass with an abrasive composition comprising a slurry containing a basic salt of magnesium in an amount of from 1 to 40 wt % in terms of a solids concentration of the slurry.

11. The method as claimed in claim 3, wherein step (ii) comprises polishing said glass with an abrasive composition comprising a slurry containing a basic salt of magnesium in an amount of from 5 to 30 wt % in terms of a solids concentration of the slurry.

12. The method as claimed in claim 3, wherein step (ii) comprises polishing said glass with an abrasive composition comprising a water slurry of a basic salt of magnesium.

13. The method as claimed in claim 4, wherein step (ii) comprises polishing said glass with an abrasive composition containing a basic salt of magnesium having an average grain size of from 0.1 to 10 μm.

14. The method as claimed in claim 4, wherein step (ii) comprises polishing said glass with an abrasive composition comprising a slurry containing a basic salt of magnesium in an amount of from 1 to 40 wt % in terms of a solids concentration of the slurry.

15. The method as claimed in claim 4, wherein step (ii) comprises polishing said glass with an abrasive composition comprising a slurry containing a basic salt of magnesium in an amount of from 5 to 30 wt % in terms of a solids concentration of the slurry.

16. The method as claimed in claim 4, wherein step (ii) comprises polishing said glass with an abrasive composition comprising a water slurry containing a basic salt of magnesium.

* * * * *